3,520,679
Patented July 14, 1970

3,520,679
METHOD FOR REMOVING SILICA FROM SILICEOUS MATERIALS
Eldon L. Christensen, William J. Maraman, and John G. Carmichael, Los Alamos, N. Mex., assignors to the United States of America as represented by the United States Atomic Energy Commission
No Drawing. Continuation-in-part of application Ser. No. 679,633, Nov. 1, 1967. This application Feb. 17, 1969, Ser. No. 799,911
Int. Cl. C22b 61/04
U.S. Cl. 75—84.1
1 Claim

ABSTRACT OF THE DISCLOSURE

A method of removing all of the silica from a siliceous material in which gaseous hydrofluoride acid is reacted at room temperature under a partial vacuum with said material, which has a water content in the range of 50–70 percent by weight.

---

This application is a continuation in part of S.N. 679,633 filed Nov. 1, 1967, now abandoned. The invention described herein was made in the course of, or under a contract with the U.S. Atomic Energy Commission.

The method of this invention is especially useful in the recovery of plutonium from residues of the electrorefining process (U.S. Pat. No. 3,098,028) and bomb reduction process (U.S. Pat. No. 2,890,110) which uses a magnesium oxide crucible containing a 2% silica binder. The procedure for dissolving magnesium oxide crucibles containing 2 percent silica binder is stated in Hanford Report (HW 20817) entitled, "Recovery of Plutonium from Slag and Crucible," C. Groot, H. H. Hopkins, Jr., and W. W. Schulz, June 15, 1951, pp. 11–13. The resulting particulate residue is a siliceous material composed of 28–48 percent by weight silica, 50–70 percent by weight water, and 2 percent by weight plutonium. The inventors took this residue as a starting material. The advantages of this process are (1) less corrosion of the equipment, (2) fast removal of the silica contaminant from the plutonium, (3) complete removal of the silica, i.e., only a few parts per million, by weight, remaining, (4) the elimination of any heat devices or temperature control equipment since this reaction is initiated at room temperature and is exothermic, and (5) is an economical process for the complete removal of the silica contaminant.

The inventors have discovered an improved method for removing silica from siliceous material (28-48 percent by weight silica) in which gaseous hydrofluoric acid reacts at room temperature with the material having a water content of 50–70 percent by weight. Gaseous hydrofluoric acid is introduced through the bottom of a chamber which is maintained at a partial vacuum and contains the siliceous material which *must* have a water content of at least 50 percent by weight. As the acid reacts with the material to form silicon tetrafluoride the unreacted material collapses over the opening where the acid enters, thereby continually exposing all the material to the acid. Since this reaction is exothermic, the temperature within the chamber is in the range of 60–80° C. which is sufficient to volatilize the resulting silicon tetrafluoride without the further application of heat. This method of hydrofluorination produces a residue with an average silica content of a few parts per million.

The basic reaction between silica and hydrofluoric acid is well known. F. Hinden, Z. Anal. Chem., (1906) p. 332 states that silicates can be decomposed by evaporation of the siliceous material with hydrofluoric and hydrochloric acids and heating so as to volatilize the silica as silicon tetrafluoride. U.S. Pat. No.3,233,969, Heller et al., is directed to a method of producing silicon tetrafluoride and is solely concerned with an economical process for doing same. Heller et al. makes quantitative use of hydrofluoroic acid and drives the reaction in this direction by using an excess of siliceous material. Consequently, there is much unreacted silica using such a process but this material is inexpensive and the hydrofluoric acid is relatively expensive.

In the process of this invention, however, the inventors were solely interested in the *complete* removal of silica so as to prevent the precipitation of the silicon compounds in various portions of the ion exchange and solvent extraction process equipment used in recovering plutonium metal. The amount and cost of the hydrofluoric acid is of no concern in the process of this invention. In summary, Heller et al., is interested only in the production of silicon tetrafluoride and not in the completeness of reaction in regard to the amount of silica which remains.

A critical and novel feature of this invention is the amount of water content of the siliceous material. The range of water content must be at least 50 percent by weight and not more than 70 percent by weight. The primary function of this process is to volatilize the silicon tetrafluoride as it is formed. With excess water, too much fluorosilicic acid will remain unvolatilized and can then precipitate. If the siliceous material has less than 50 percent by weight water, the reaction is too slow and is not complete within a reasonable length of time. As noted from both of the references cited above, it has always been thought that the addition of heat was required to make the reaction of hydrofluoric acid and silica effective and efficient. It is unexpected that this reaction occurs under a partial vacuum at room temperature using only the heat generated by the reaction so that the resulting silicon tetrafluoride is volatilized as quickly as it forms.

It is therefore an object of this invention to provide a process for the complete removal of silica from a siliceous material.

A further object of this invention is to provide a process in which the silica is volatilized as silicon tetrafluoride with this reaction being initiated at room temperature and without the addition of heat, said process including a requirement that the siliceous material have a water content in the range of 50–70 percent by weight.

Other objects of this invention will be more apparent from the following description of the preferred embodiment.

The reaction between gaseous hydrofluoric acid and silica is started at room temperature with the siliceous material (28–48 percent by weight silica) being contained within a closed vessel so that the gaseous hydrofluoric acid enters at the bottom and the resulting gaseous silicon tetrafluoride being evacuated from the top of the container. The siliceous material as obtained from the dissolution of the magnesium oxide crucible and containing 28–48 percent by weight silica is placed within the container after having been dried until the water content is in the range of 50–70 percent by weight of the material. The gaseous hydrofluoric acid enters at the bottom of the container while a partial vacuum (10 inches of mercury) is maintained. The temperature of the reaction chamber and the material contained therein rises during the course of the process to a range of between 60–80° C. Normally, the starting siliceous material is of the order of 100 grams and by the end of the process essentially no detectable amount of silica is left. The time for the complete reaction varies between 20–30 minutes.

Since many embodiments might be made in the present invention and since many changes might be made in the embodiment described, it is to be understood that the foregoing description is to be interpreted as illustrative only and not in a limiting sense. In particular, the disclosed process is carried out at room temperature, uses only the heat developed from the reaction to volatilize the silicon tetrafluoride, and most important, the siliceous material must have a water content in the range of 50–70 percent by weight.

What we claim is:

1. An improved method for removing silica from particulate particles of siliceous material containing plutonium in which gaseous hydrofluoric acid is reacted with the said material, volatilizing the silica as silicon tetrafluoride, wherein the improvement comprises having a siliceous material with a water content in the range of 50–70 percent by weight, and a silica content in the range of 28–48 percent by weight, maintaining the reaction under a partial vacuum for a period in the range of 20–30 minutes, initiating the reaction at room temperature with no additional heat being supplied and subsequently removing metallic plutonium.

References Cited

UNITED STATES PATENTS

| | | | |
|---|---|---|---|
| 2,624,698 | 1/1953 | Hickey | 23—110 |
| 2,861,872 | 11/1958 | Heller et al. | 23—182 |
| 3,087,787 | 4/1963 | Flemmert | 23—88 |
| 3,273,963 | 9/1966 | Gunn. | |

CARL D. QUARFORTH, Primary Examiner

G. SOLYST, Assistant Examiner

U.S. Cl. X.R.

23—88, 182